Nov. 10, 1964 W. L. LONG 3,156,792
DELAYED ACTION LIGHT SWITCH DEVICE
Filed May 26, 1961 2 Sheets-Sheet 1
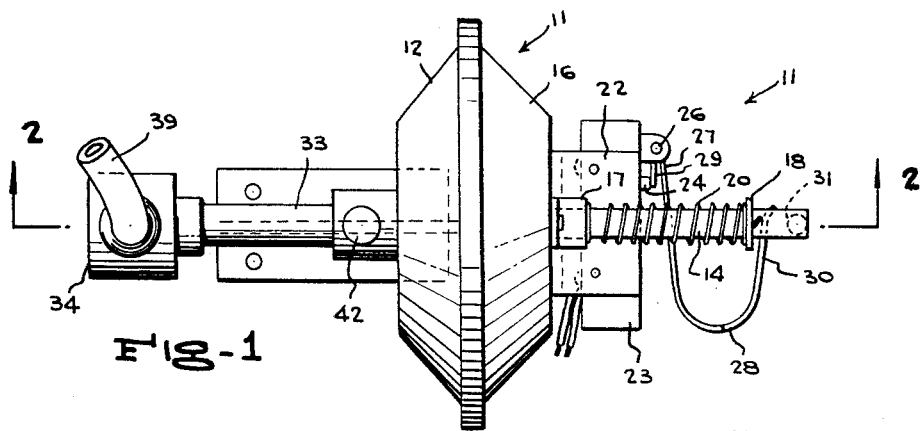
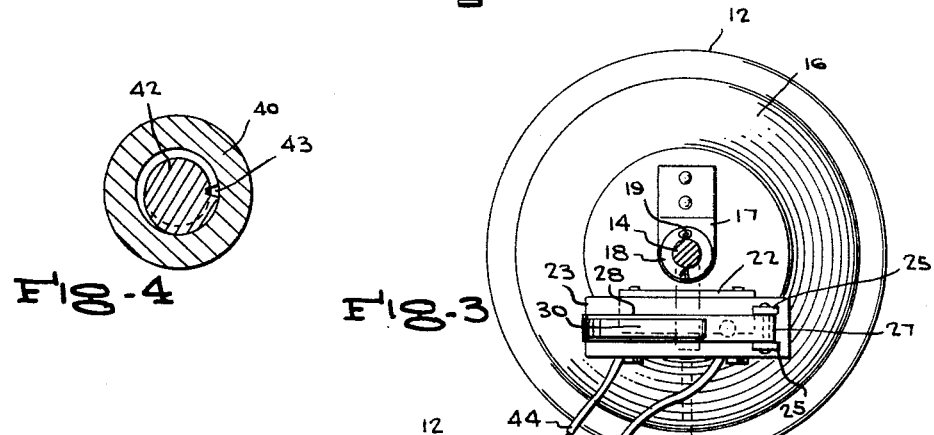
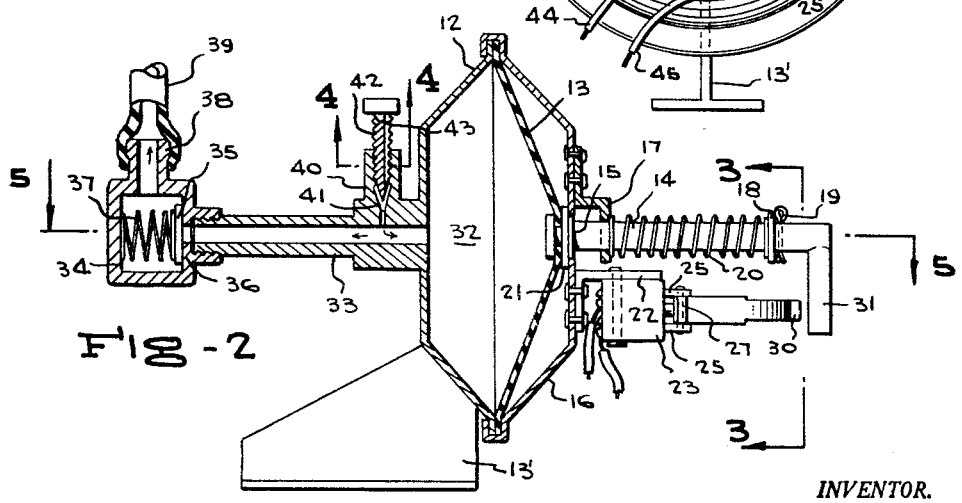
INVENTOR.
WESLEY L. LONG
BY
McMorrow, Berman & Davidson
ATTORNEYS

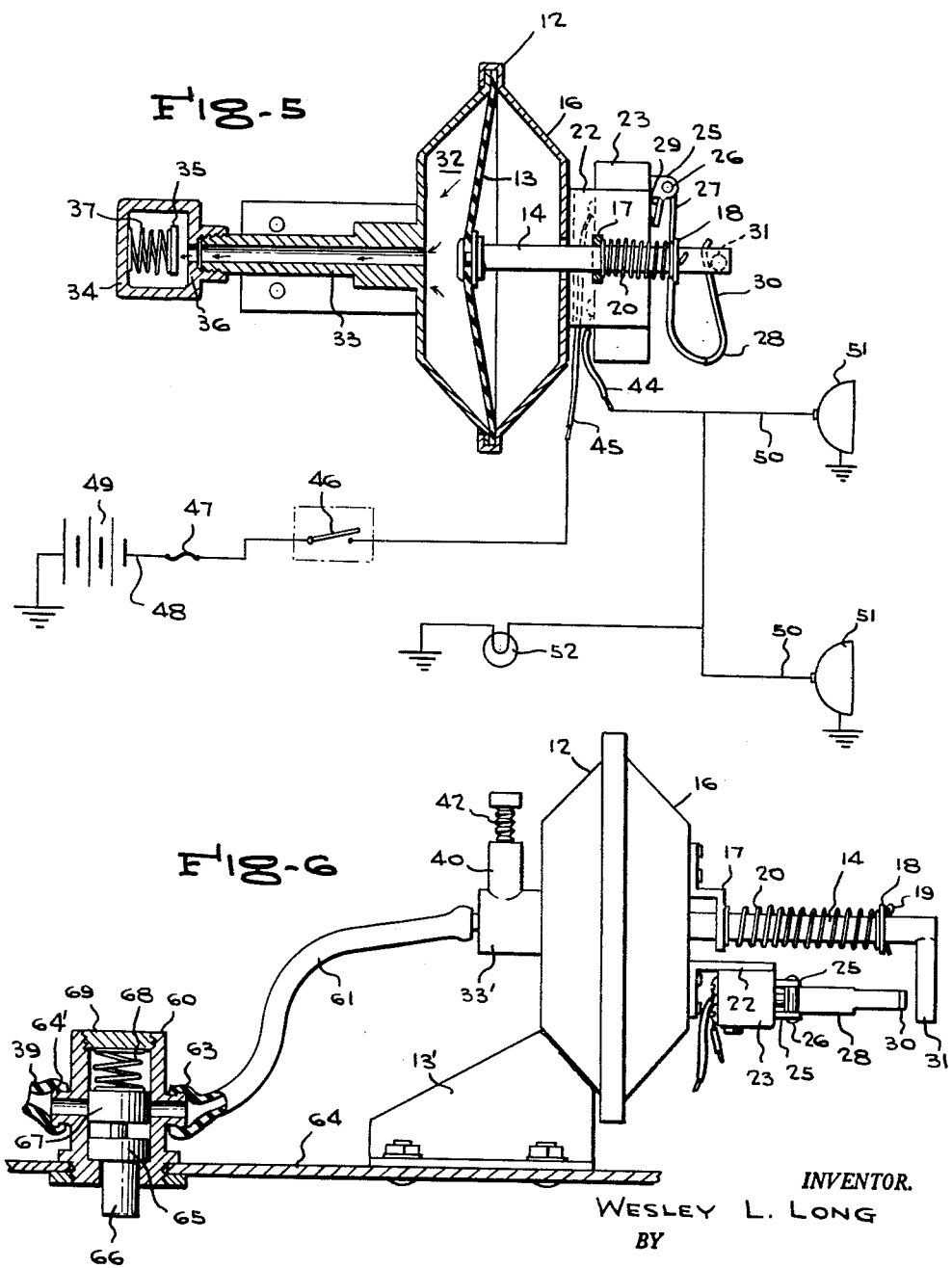

3,156,792
DELAYED ACTION LIGHT SWITCH DEVICE
Wesley L. Long, 22 Sunnyside Drive, Springfield, Ill.
Filed May 26, 1961, Ser. No. 113,004
2 Claims. (Cl. 200—34)

This invention relates to lighting systems for motor vehicles, and more particularly to means for delaying the deenergization of a motor vehicle lighting system for a predetermined time period after the vehicle motor has been cut off so as to illuminate the area adjacent the vehicle to allow the occupants of the vehicle to safely leave same.

A main object of the invention is to provide a novel and improved delayed action switching system for use with motor vehicle headlamps, and the like, to maintain the headlamps energized for a predetermined time period after the associated vehicle engine has been cut off, whereby to provide illumination of the area adjacent the vehicle for such predetermined time, the device being relatively simple in construction, being easy to install, and being reliable in operation.

A further object of the invention is to provide an improved delayed action switching means for a motor vehicle headlamp system adapted to be connected either to the high or low beam headlamp filaments of a motor vehicle or to any other lamps on the vehicle, the device involving relatively inexpensive components, being durable in construction, and providing a means for illuminating the area adjacent a vehicle after the vehicle has been parked to enable the occupants of the vehicle to safely leave same, the device providing illumination for a predetermined time period, after which it turns off the lamps.

A still further object of the invention is to provide an improved delayed action switching system for motor vehicle lamps to maintain the lamps energized for a predetermined time period subsequent to the cutting off of the vehicle engine, for example, where the vehicle is parked and it is desired to maintain the area adjacent the vehicle illuminated for a period of time sufficient to allow the occupants of the vehicle to leave same, the device being useful as a safety means to prevent accidents from falling, stumbling, or the like, and to discourage prowlers from taking advantage of the darkness after the occupants leave the car and while the occupants are enroute to an adjacent building.

A still further object of the invention is to provide an auxiliary energizing circuit for the lamps of a motor vehicle which may be employed to energize said lamps when a failure occurs in the normal energizing circuit of said lamps during the operation of the vehicle, such as a faulty switch, a blown fuse, or the like, said auxiliary energizing circuit providing direct battery current to the lamps until necessary repairs can be made.

Further objects and advantages of the invention will become apparent from the following description and claims, and from the accompanying drawings, wherein:

FIGURE 1 is a side elevational view of an improved delayed action switch device constructed in accordance with the present invention.

FIGURE 2 is a longitudinal cross sectional view taken substantially on the line 2—2 of FIGURE 1.

FIGURE 3 is a transverse cross sectional view taken substantially on the line 3—3 of FIGURE 2.

FIGURE 4 is an enlarged cross sectional detail view taken substantially on the line 4—4 of FIGURE 2.

FIGURE 5 is a longitudinal cross sectional view taken substantially on the line 5—5 of FIGURE 2 and showing the device under vacuum, as well as illustrating the electrical connections of the device in a typical installation.

FIGURE 6 is a side elevational view, partly in vertical cross section, showing a modified form of delayed action switch device according to the present invention.

Referring to the drawings, and more particularly to FIGURES 1 to 5, 11 generally designates a delayed action switch device according to the present invention adapted to be employed with a motor vehicle having an engine of the usual type, namely, one in which vacuum is developed in the intake manifold of the engine while the engine is running. The device 11 comprises a diaphragm housing 12 mounted on a supporting brace 13' adapted to be fastened to any convenient portion of a motor vehicle for example, adapted to be secured to the fire wall adjacent the engine compartment. Sealingly secured in the housing 12 is a flexible diaphragm 13 to the center portion of which is secured the plunger rod 14, the plunger rod extending through an aperture 15 provided in the rear wall 16 of the housing. The plunger rod 14 extends slidably through an offset supporting bracket 17 secured to rear wall 16, and is provided with a bearing washer 18 urged against a stop element comprising a cotter pin 19, by a coiled spring 20 which surrounds the plunger member 14 and bears between bracket 17 and washer 18, as clearly shown in FIGURE 2. The coiled spring 20 biases the diaphragm 13 to the position illustrated in FIGURE 2, namely, to a position wherein the annular flange 21 on the forward end portion of the plunger bears against the margin of the opening 15.

Secured to the rear wall 16 adjacent bracket 17 is an angle bracket 22 on which is mounted a micro-switch 23 of conventional construction having the operating plunger 24, the switch 23 being normally open. Designated at 25, 25 are a pair of spaced parallel lugs which project from the switch 23 adjacent and on opposite sides of the operating plunger 24. A transverse pin 26 connects the lugs 25, 25, and pivoted thereon between said lugs is the U-shaped portion 27 of a looped lever 28, said U-shaped portion 27 having the end arm 29 engaging the switch operating plunger 24. The free outer portion of the looped lever 28 comprises an arm 30 which extends inwardly adjacent a transversely extending arm 31 formed on the end of plunger member 14, in a position to be engaged thereby responsive to the retraction of the plunger member 14 and to rotate in a clockwise direction, as viewed in FIGURE 1, whereby to operate plunger member 24 inwardly to close the switch 23.

A chamber 32 is defined between the front wall of housing 12 and the diaphragm 13. Said front wall is formed with a conduit 33 which terminates in a check valve chamber 34, the chamber 34 containing a check valve disc 35 which is biased against the connecting wall 36 between chamber 34 and conduit 33 by a coiled spring 37 positioned in the chamber, as shown in FIGURE 2. Chamber 34 is provided with the conduit fitting 38 which is connected by a flexible conduit 39 to the intake manifold of the engine of the associated vehicle.

The conduit 33 is formed adjacent the front wall of chamber 12 with a bleeder vent fitting 40, said vent fitting having the internal vent passage 41 and being provided with a threaded valve element 42 having a vent groove 43 which communicates with the passage 41. The passage 41 is generally conical in shape, as shown in FIGURE 2, and the end of the screw valve 42 is similarly conical, so that the screw valve 42 acts as a needle valve and may be adjusted to provide a desired degree of restriction of the vent passage between conduit 33 and atmosphere. Thus, when the space 32 is under vacuum, and with check valve disc 35 held against the associated port in wall 36, a predetermined period of time, determined by the setting of the adjustable valve element 42, will be required to relieve the vacuum in chamber 32 and to allow diaphragm 13 to unflex from the position of FIGURE 5 to the position of FIGURE 2.

As shown in FIGURE 5, respective terminal wires 44 and 45 are connected to the terminals of switch 23. Terminal wire 45 is connected through a suitable master control switch 46 mounted in the vehicle and a fuse 47 to the ungrounded terminal 48 of the vehicle battery 49. The wire 44 is connected to the ungrounded terminal wires 50, 50 leading to the ungrounded terminals of the lamps associated with a pair of vehicle headlights 51, 51. A pilot lamp 52 is connected between wire 44 and the vehicle frame, so that the lamp 52 will become illuminated simultaneously with the closure of switch 23 when the master switch 46 is closed, indicating that the time delay switch device is set for operation.

In operation, when the vehicle engine is running and the switch 46 is closed, the vacuum will cause the diaphragm 13 to flex to the position thereof shown in FIGURE 5, the check valve 35 opening to allow the air to be exhausted from chamber 32 by the vacuum, after which the check valve disc 35 will seat against the wall 36 and substantially seal the space 32. With the diaphragm 13 flexed to the position of FIGURE 5, the arm 31 acts against the free end portion of the looped lever 28, causing the inner end arm 29 of the lever to force the operating plunger 24 of switch 23 inwardly, closing the switch. This establishes an energizing circuit for the lamps 51, simultaneously energizing the pilot lamp 52. When the vehicle engine is cut off, the lamps 51 will be maintained energized for the period of time required for atmospheric air to relieve the vacuum in chamber 32 through the restricted passage 41, during which time the lamps 51 will continue to be energized and will furnish illumination to the area adjacent the vehicle. After the vacuum in chamber 32 has been relieved, the diaphragm 13 will assume the position thereof illustrated in FIGURE 2, because of the biasing action of coiled spring 20, allowing the switch 23 to open and causing the lamps 51 to become deenergized.

When the vehicle is again operated, energization of the pilot lamp 52 will notify the operator that the master switch 46 is closed and that the time delay device is set for operation.

FIGURE 6 illustrates a modified form of the invention wherein no check valve is employed between the diaphragm chamber 12 and the conduit 39, but instead a manually operated normally closed valve 60 is employed to evacuate the working chamber of the diaphragm housing 12. Thus, the diaphragm housing is provided with the conduit fitting 33' formed with the adjustable bleeder valve conduit 40 containing the threaded vent valve element 42, similar to that described in the form of the invention of FIGURES 1 to 5. A flexible conduit 61 connects the fitting 33' to a conduit fitting 63 provided in the wall of the housing of the valve 60. Directly opposite the conduit fitting 63, the wall is formed with another conduit fitting 64' to which is connected the end of the vacuum conduit 39. The valve housing 60 is mounted on the control panel 64 in a position convenient to the position of the vehicle operator, the valve 60 being provided with the operating plunger 65 having the push button element 66 projecting outwardly in the passenger compartment and being accessible to the vehicle operator. The plunger 65 is formed with the cylindrical blanking portion 67, said plunger being urged toward blanking position by a coiled spring 68 disposed in the portion of the housing between the blanking element 67 and the end wall 69 of said housing, urging the plunger to blanking position, as shown in FIGURE 6. In this position the blanking element 67 blocks passage between conduit fittings 63 and 64, as shown in FIGURE 6. When the push button element 66 is pushed inwardly, the space between conduit elements 63 and 64 becomes unobstructed, so that the working chamber of the diaphragm housing 12 may become evacuated, allowing the switch 23 to be closed by the action of plunger 14, as previously described in connection with the embodiment illustrated in FIGURES 1 to 5. With push button element 66 released, the vacuum in the working chamber of the diaphragm housing 12 will become relieved after a predetermined time period, depending upon the setting of the adjustable valve element 42, so that switch 23 opens at the end of said predetermined time period. Thus, in using the form of the invention shown in FIGURE 6, the operator presses the push button 66 shortly before cutting off the engine, whereby to initiate the time period of closure of switch 23. The push button 66 is pressed inwardly for a sufficient time to evacuate the working chamber of diaphragm housing 12, and is thereafter released. The operator then cuts off the vehicle engine, and the lamps 51 will remain energized for a sufficient period of time thereafter to allow the occupants of the vehicle to safely leave same. At the end of the established time period switch 23 opens, deenergizing the vehicle lamps 51.

While certain specific embodiments of an improved delayed action vehicle lighting system and a switch device to be employed therein have been disclosed in the foregoing, it will be understood that various modifications within the spirit of the invention may occur to those skilled in the art. Therefore, it is intended that no limitations be placed on the invention except as defined by the scope of the appended claims.

What is claimed is:

1. In an automatic motor vehicle light control system of the type providing delayed deenergization of the vehicle headlights for a predetermined period of time after the vehicle engine has been shut off, a delay switch system comprising a chamber having a flexible diaphragm mounted therein, means to connect said chamber at times to the intake manifold of the engine while the engine is running, whereby to flex said diaphragm, a normally open switch mounted adjacent said chamber and having an externally projecting operating plunger, a loop-shaped lever having a U-shaped end portion provided with an outer arm, means pivotally supporting said U-shaped end portion on said switch with said outer arm in a position to engage said plunger and close the switch responsive to rotation of the lever, said lever having a free outer portion opposite said U-shaped end portion, a plunger member slidably mounted in a wall of the chamber and connected at its inner end to said diaphragm, a transversely extending arm on the outer end of said last-named plunger member located in a position to engage said free outer portion of the lever and to rotate the lever responsive to flexure of the diaphragm, whereby to close said switch, and restricted vent means connecting the chamber to atmosphere to provide delayed release of the diaphragm when the engine is shut off.

2. In an automatic motor vehicle light control system of the type providing delayed deenergization of the vehicle headlights for a predetermined period of time after the vehicle engine has been shut off, a delay switch system comprising a chamber having a flexible diaphragm mounted therein, means to connect said chamber at times to the intake manifold of the engine while the engine is running, whereby to flex said diaphragm, a normally open switch mounted adjacent said chamber and having an externally projecting operating plunger, a loop-shaped lever having a U-shaped end portion provided with an outer arm, a pair of spaced lugs on said switch adjacent said operating plunger, means pivotally mounting said U-shaped end portion between said lugs with said outer arm in a position to engage said plunger and close the switch responsive to rotation of the lever, said lever having a free outer portion opposite said U-shaped end portion, a plunger member slidably mounted in a wall of the chamber and connected at its inner end to said diaphragm, a transversely extending arm on the outer end of said last-named plunger member located in a position to engage said free outer portion of the lever and to rotate the lever responsive to flexure of the diaphragm, whereby to close said switch, and restricted vent means connecting the chamber to atmosphere to provide delayed release of the diaphragm when the engine is shut off.

References Cited in the file of this patent
UNITED STATES PATENTS

| | | |
|---|---|---|
| 2,045,274 | Kundig | June 23, 1936 |
| 2,770,687 | Morrow | Nov. 13, 1956 |
| 3,039,020 | Sargent | June 12, 1962 |